United States Patent [19]

Nihei et al.

[11] Patent Number: 5,708,342
[45] Date of Patent: Jan. 13, 1998

[54] METHOD OF CONTROLLING ACCELERATION/DECELERATION TIME CONSTANTS FOR ROBOT

[75] Inventors: Ryo Nihei, Fujiyoshida; Yasuo Naito; Takeshi Okada, both of Yamanashi; Tamotsu Sakai, Tsuru, all of Japan

[73] Assignee: Fanuc Ltd., Yamanashi, Japan

[21] Appl. No.: 757,340

[22] Filed: Nov. 27, 1996

Related U.S. Application Data

[63] Continuation of Ser. No. 360,686, filed filed as PCT/JP94/00794 May 17, 1994, abandoned.

[30] Foreign Application Priority Data

May 27, 1993 [JP] Japan ............... 5-126139

[51] Int. Cl.$^6$ ............................. G05B 13/00
[52] U.S. Cl. ............... 318/558.18; 318/568.22; 318/617
[58] Field of Search ............... 318/567–574, 318/271, 617, 615, 616, 619; 395/95, 96

[56] References Cited

U.S. PATENT DOCUMENTS

| | | | |
|---|---|---|---|
| 3,916,279 | 10/1975 | Kawano et al. | 318/430 |
| 4,099,111 | 7/1978 | Inaba et al. | 318/493 X |
| 4,297,623 | 10/1981 | Dupont | 318/410 |
| 4,473,786 | 9/1984 | Miyashita et al. | 318/561 |
| 4,807,467 | 2/1989 | Kugler | 73/118.1 |
| 5,231,860 | 8/1993 | Tsuruta et al. | 72/21 |
| 5,309,074 | 5/1994 | Mizukami | 318/571 |
| 5,325,467 | 6/1994 | Torii et al. | 395/96 |
| 5,384,594 | 1/1995 | Sieber et al. | 348/169 |

FOREIGN PATENT DOCUMENTS

| | | |
|---|---|---|
| 61-156406 | 7/1986 | Japan. |
| 4-30203 | 2/1992 | Japan. |

*Primary Examiner*—Brian Sircus
*Attorney, Agent, or Firm*—Nikaido Marmelstein Murray & Oram LLP

[57] ABSTRACT

The invention is directed to a method of controlling acceleration and deceleration time constants for a robot wherein the acceleration and deceleration time constants of a servo motor are each set at an optimum value based on the amount of movement, load, etc., thereby achieving a reduction in the operation time of the robot.

The control method controls the operation of the robot while setting the acceleration and deceleration time constants at optimum values for each block instruction, and comprises the following five stages: the first stage comprising determining from the distance to the target position whether or not the speed will reach the taught speed (S1), setting the taught speed as velocity V if it is determined that the speed will reach the taught speed (S2), otherwise obtaining an ultimate velocity (S3) and setting the obtained ultimate velocity as velocity V (S4); the second stage comprising obtaining an output torque corresponding to the velocity V from a velocity-torque curve (S5); the third stage comprising obtaining an acceleration torque and a deceleration torque by subtracting a static load torque from the output torque (S6); the fourth stage comprising obtaining the magnitude of acceleration for acceleration and for deceleration (S7); and the fifth stage comprising obtaining an acceleration time constant and a deceleration time constant from the magnitudes of acceleration and the velocity V (S8), and then determining the largest acceleration time constant and largest deceleration time constant in absolute value terms or determining the optimum acceleration time constant and deceleration time constant for each individual axis (S9).

3 Claims, 4 Drawing Sheets

METHOD OF CONTROLLING ACCELERATION/DECELERATION TIME CONSTANTS FOR ROBOT

This application is a continuation of application Ser. No. 08/360,686 filed Jan. 3, 1995 now abandoned, which is a 371 of PCT/JP94/00794, filed May 17, 1994.

TECHNICAL FIELD

The present invention relates to a method of controlling acceleration and deceleration time constants for a robot whereby the operation of the robot is controlled while setting the servo motor acceleration and deceleration time constants at optimum values for each block instruction in an NC program, and more particularly to a method of controlling acceleration and deceleration time constants for a robot whereby the operation of the robot is controlled while determining the optimum acceleration and deceleration time constants for the each block instruction.

An NC program consists of a plurality of block instructions, each of which performs one of operations such as linear interpolation, circular interpolation and the like.

BACKGROUND ART

In the prior art, acceleration and deceleration time constants for a robot are both set at the same value regardless of the posture of the robot or the distance the robot must move. Alternatively, optimum acceleration and deceleration time constants are calculated from the posture at the current position and at the target position, and the larger of the two values is set as both the acceleration and the deceleration time constant.

However, if these time constants are set with a lee way, the time necessary to complete an NC program becomes long. On the contrary, if the time constants are set at a smaller value than required, the servo motor cannot be suitably driven because of insufficient torque. This gives rise to the problem that the NC program executing time cannot be shortened even if the servo motor is capable of providing sufficient torque. In other words, this requires increasing the servo motor size if the NC program executing time is to be shortened, which leads to the problem of an increase in cost.

Furthermore, for axes of the motions on which gravity acts, the effect of gravity may be different at the motion start position than at the motion end position. However, according to the prior art control method wherein the acceleration time constant and the deceleration time constant are both set at the same value, both of the accel-and-decel time constants are set at the larger values, an extra operation time may be required.

DISCLOSURE OF THE INVENTION

In view of the above problems, it is an object of the invention to provide a method of controlling the acceleration and the deceleration time constants for a robot whereby the operation time for a robot to complete a program is shortened by setting the acceleration time constant and deceleration time constants of a servo motor, independently of each other, at optimum values according to the amount of movement, load, etc. on the robot arm driven by the servo motor.

FIG. 1 is a flowchart illustrating the basic processing sequence in a method of controlling acceleration and deceleration time constants for a robot according to the present invention. To achieve the above object, the method of controlling acceleration and deceleration time constants for a robot according to the present invention, which involves determining servo motor acceleration and deceleration time constants at optimum values for each block instruction and thereby controlling the operation of the robot, comprises the following stages.

First stage: Obtain ultimate velocity from the amount of movement by executing the block instruction (steps S1 to S4).

Second stage: Obtain the output torque of the servo motor from the ultimate velocity (step S5).

Third stage: Obtain acceleration torque and deceleration torque by subtracting static load torque from the output torque (step S6).

Fourth stage: Obtain the magnitude of acceleration for acceleration and for deceleration from the acceleration torque and deceleration torque and from the inertial load on the servo motor at the current position and at the target position (step S7).

Fifth stage: Determine the acceleration time constant and the deceleration time constant from the magnitude of acceleration for the acceleration and for the deceleration, respectively (step S8, S9).

In the method of controlling acceleration and deceleration time constants for a robot according to the present invention, the ultimate velocity is obtained from the amount of movement by the next block instruction to be executed. For example, when the amount of movement is small, the moving speed is set at a small value, and if the amount of movement exceeds a predetermined value, the ultimate velocity is equal to the taught velocity. From this ultimate velocity and from the velocity-torque curve of the servo motor, the output torque of the servo motor is obtained. This velocity-torque curve allows for viscous loss. By subtracting from the output torque the static load torque including the friction toque and the torque against gravity at current and target positions, an acceleration torque for accelerating a load and a deceleration torque for decelerating it are obtained. From the acceleration torque and deceleration torque, the acceleration time constant and deceleration time constant are respectively determined, and the acceleration and the deceleration are controlled independently of each other. This achieves a reduction in the operation time of the robot.

An embodiment of the present invention will be described below with reference to the accompanying drawings.

BEST MODE FOR CARRYING OUT THE INVENTION

Figure 2:
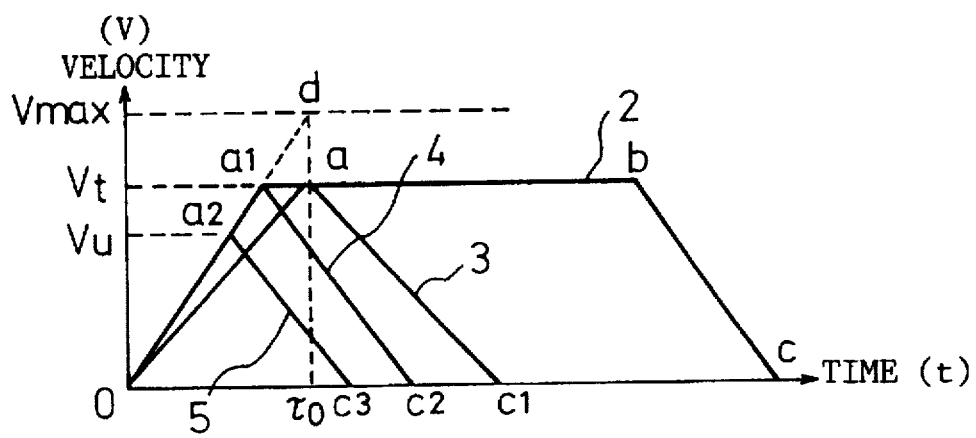
FIG. 2 is a diagram showing the relationship between the moving distance and moving speed of each axis of a robot.

FIG. 2 is a diagram showing the relationship between the moving distance and moving speed of each axis of a robot.

In the diagram, the abscissa represents the time, and the ordinate represents the speed. When the moving distance (or the rotation angle) is sufficiently long, the graph passes through points o, a, b, and c as shown by line 2. That is, the axis of the robot is accelerated to point a with time constant τ0, moves constant at taught speed Vt, and decelerates until it stops at point c. The area surrounded by lines joining points o, a, b, and c is the moving distance. As the moving distance decreases, the constant speed period between a and b becomes shorter. When the distance between points a and b is larger than zero, the motion from point o to point c is called a long motion. On the other hand, if the distance between points a and b is zero or the constant speed period does not exist, the motion is called a short motion. At the boundary between the long motion and short motion, the graph is the locus of points o, a, and c1 as shown by line 3.

When the moving distance further decreases, the acceleration changes until it coincides with straight line od defined by the time constant τ0 and high-speed maximum velocity Vmax, and the result is line 4 passing through points o, a1, and c2. When the moving distance is further reduced, the result is line 5 passing through points o, a2, and c3. The maximum velocity attained at this time is Vu, which is called the ultimate velocity.

Figure 3:
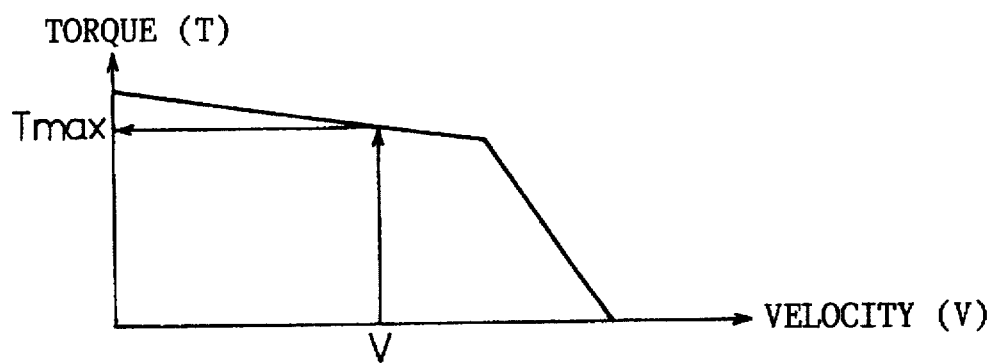
FIG. 3 is a diagram showing the velocity-torque characteristic of a servo motor.

FIG. 3 is a diagram showing the velocity-torque characteristic of a servo motor. In the diagram, the abscissa represents the velocity (V) and the ordinate the torque (T). That is, when a particular velocity (V) is determined, the maximum torque Tmax corresponding to that velocity is also determined. These relationships are stored in a robot control apparatus as data for each of the servo motors contained in the robot.

Figure 4:
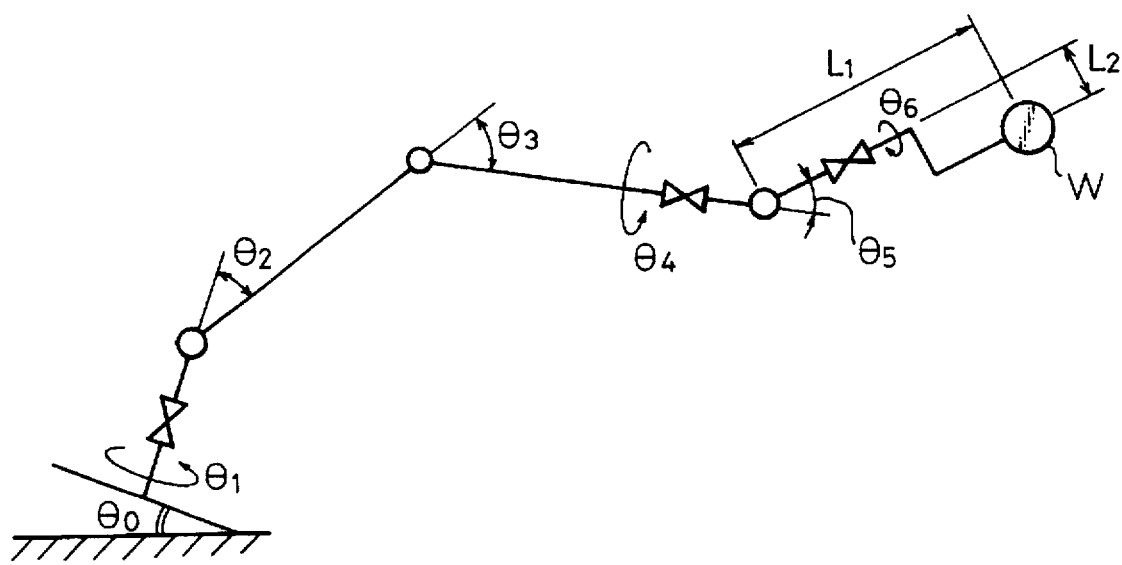
FIG. 4 is a schematic diagram of a robot.

FIG. 4 is a schematic diagram of the robot. When the mounting angle of the robot is denoted as θ0, the axis angles of first to sixth axes as θ1, θ2, ..., θ6, respectively, the load weight as W, and the offset amounts from the center of the fifth axis to the load gravity center O as L1 and L2, then the static load torques and moments of inertia about the respective axes are expressed by the following equations. The static load torque includes the friction torque and the torque against gravity.

Denoting the moments of inertia about the first to sixth axes as I1, I2, ..., I6, and likewise, the static load torques as Tw1, Tw2, ..., Tw6, these values can be obtained from the following equations.

```
I1 = F1(θ2, θ3, θ4, θ5, θ6, L1, L2, W)
I2 = F2(θ3, θ4, θ5, θ6, L1, L2, W)
I3 = F3(θ4, θ5, θ6, L1, L2, W)
I4 = F4(θ5, θ6, L1, L2, W)
I5 = F5(θ6, L1, L2, W)
I6 = F6(L1, L2, W)
Tw1 = G1(θ0, θ1, θ2, θ3, θ4, θ5, θ6, L1, L2, W)
Tw2 = G2(θ0, θ1, θ2, θ3, θ4, θ5, θ6, L1, L2, W)
Tw3 = G3(θ0, θ1, θ2, θ3, θ4, θ5, θ6, L1, L2, W)
Tw4 = G4(θ0, θ1, θ2, θ3, θ4, θ5, θ6, L1, L2, W)
Tw5 = G5(θ0, θ1, θ2, θ3, θ4, θ5, θ6, L1, L2, W)
Tw6 = G6(θ0, θ1, θ2, θ3, θ4, θ5, θ6, L1, L2, W)
```

These functions F1 to F6 and G1 to G6 can be calculated from the construction and the current posture of the robot. Therefore, when the robot is in a particular posture, the moments of inertia I1 to I6 and the static load torques Tw1 to Tw6 can be obtained by calculation within the robot control apparatus.

When reproducing a program, the moments of inertia and the static load torques are calculated successively for the current position Pn as well as for the target position P(n+1). However, θ0, L1, L2, and W are set separately because their values differ depending on the motion the robot is to perform.

Figure 5:
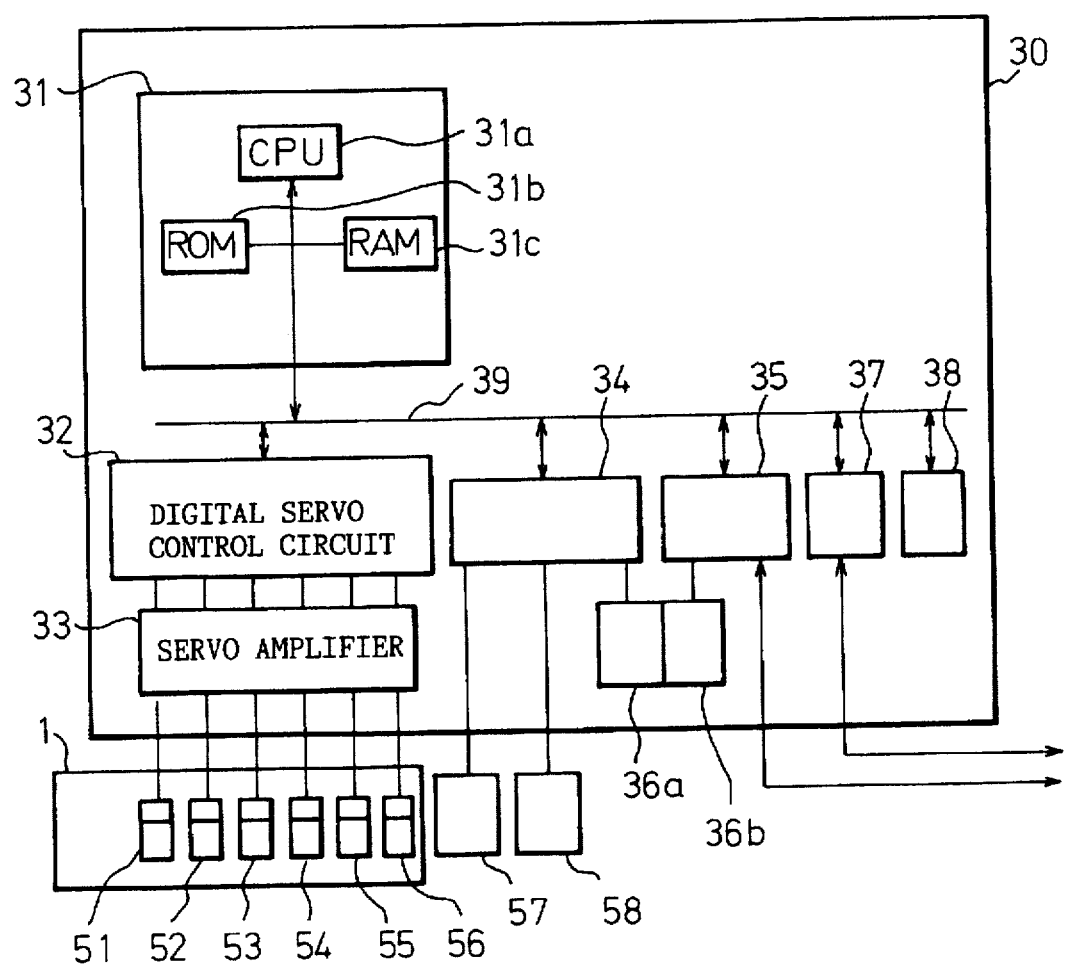
FIG. 5 is a general block diagram of a robot control apparatus for carrying out the invention.

FIG. 5 is a general block diagram of a robot control apparatus for carrying out the present invention. The robot control apparatus 30 includes a processor board 31 which contains a processor 31a, a ROM 31b, and a RAM 31c. The processor 31a controls the overall operation of the robot control apparatus 30 in accordance with the system program stored in the ROM 31b. The RAM 31c stores data, such as the above-stated L1, L2, and W, operation programs, etc. A portion of the RAM 31c is organized as a nonvolatile memory. The data, operation programs, etc. are stored in the nonvolatile memory area. The processor board 31 is coupled to a bus 39.

A digital servo control circuit 32, which is coupled to the bus 39, drives servo motors 51, 52, 53, 54, 55, and 56 via a servo amplifier 33 by instructions from the processor board 31. These servo motors are contained in the robot 1 and move the respective axes of the robot 1. A serial port 34, which is coupled to the bus 39, is connected to a teaching control panel 57 with built-in display, and also to other RS232C equipment 58. The teaching control panel 57 with built-in display is used to enter operation programs, etc.

The serial port 34 may also be connected to a CRT 36a.

An operation panel 36b is connected to a digital I/O 35. Signals are output to external devices via the digital I/O 35 or analog I/O 37. A large-capacity memory stores operation programs, etc.

In the above description, the servo control circuit is described as a digital servo control circuit, but instead, an analog servo control circuit may be used.

Figure 1:
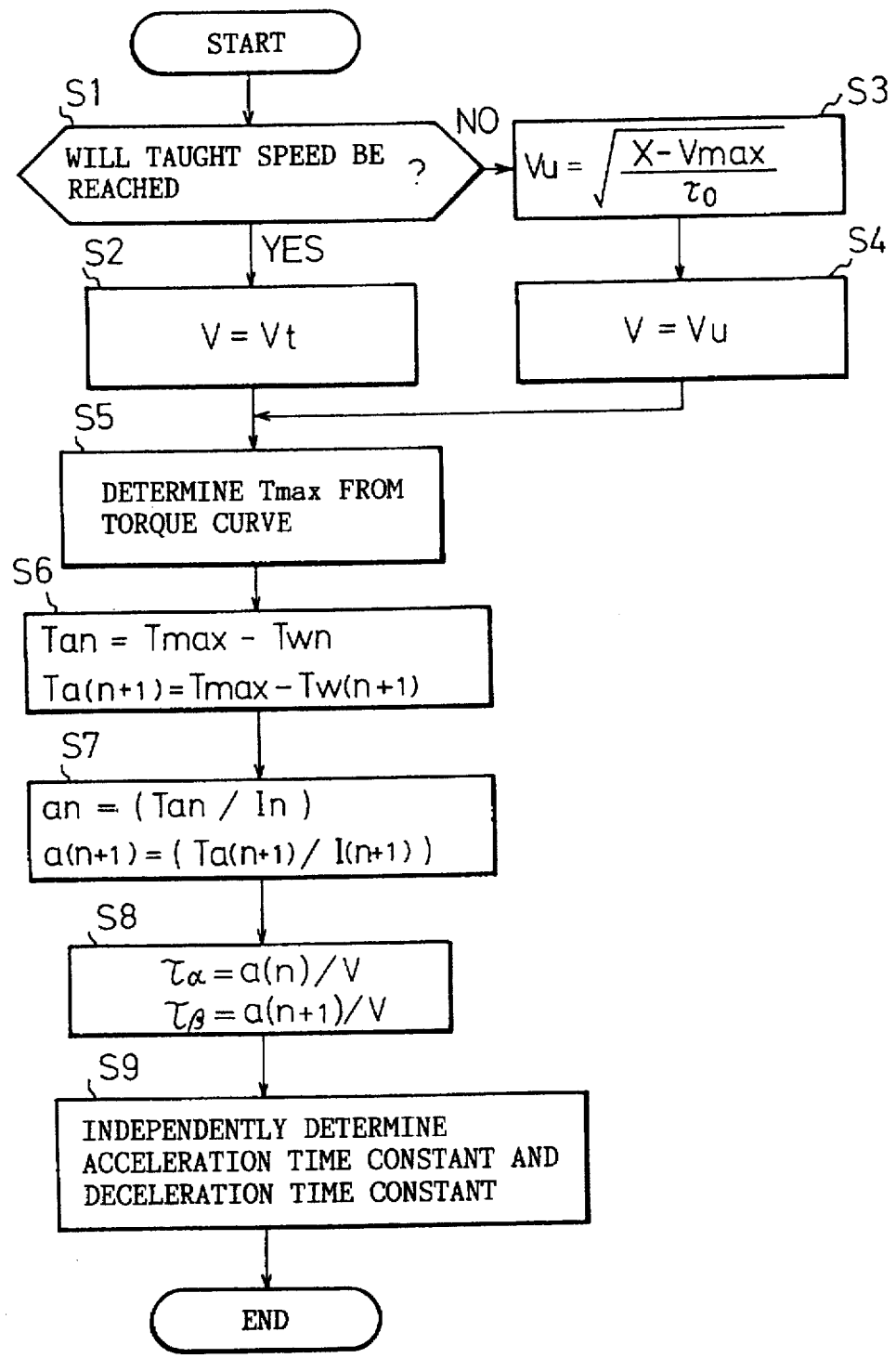
FIG. 1 is a flowchart illustrating the basic processing sequence in a method of controlling acceleration and deceleration time constants for a robot according to the present invention.

Referring back to FIG. 1, a detailed description will be given below. FIG. 1 is a flowchart illustrating the basic processing sequence in the method of controlling acceleration and deceleration time constants for a robot according to the present invention. In the figure, the number suffixed to S designates the step number.

(S1): From the distance to the target position, a decision is made as to whether or not the speed will reach taught speed Vt. If it is decided that the speed will reach Vt, the process proceeds to S2; otherwise, the process proceeds to S3.

(S2): The taught speed Vt is chosen as velocity V.

(S3): Ultimate velocity Vu is obtained from the following equation, using distance X to the target position.

$$Vu = \sqrt{(X \cdot Vmax/\tau0)}$$

(S4): The ultimate velocity Vu is chosen as velocity (S5): The maximum torque Tmax corresponding to the velocity V is obtained from the velocity-torque curve shown in FIG. 3.

(S6): The acceleration torque Ta is obtained by subtracting the static load torque Tw from the maximum torque Tmax. From the static torque at the current position, Twn, and that at the target position, Tw(n+1), acceleration torque Tan and deceleration torque Ta(n+1) are obtained for the respective positions.

$$Tan = Tmax - Twn$$

$$Ta(n+1) = Tmax - Tw(n+1)$$

(S7): From the acceleration torque Tan and deceleration torque Ta(n+1), and from the moment of inertia at the current position, In, and that at the target position, I(n+1), the magnitudes of acceleration, an and a(n+1), are obtained for the respective positions.

$$an = (Tan/In)$$

$$a(n+1) = (Ta(n+1)/I(n+1))$$

(S8): From the magnitudes of acceleration, an and a(n+1), and the velocity v, acceleration time constant $\tau\alpha$ and deceleration time constant $\tau\beta$ are respectively calculated using the following equations.

$$\tau\alpha = an/V$$

$$\tau\alpha = a(n+1)/V$$

Here, the acceleration and deceleration time constants can be adjusted by multiplying by a fine adjust constant A at each taught point, in other words, each predetermined point in the program.

Steps S1 to S8 are repeated for each axis.

(S9): The largest acceleration time constant $\tau\alpha$ and largest deceleration time constant $\tau\beta$ in absolute value terms are determined for each axis. Alternatively, of the acceleration time constants $\tau\alpha$ and deceleration time constants $\tau\beta$ for the six axes, the largest ones in absolute value terms are determined as the acceleration time constant and deceleration time constant for each of the axes. Thus, by setting the acceleration time constant and deceleration time constant respectively at the same values for all axes, that is, by setting all the axes with the same acceleration, the end of the robot arm is prevented from deviating from the taught path. In cases where the intermediate path is not a concern, the acceleration time constant and deceleration time constant need not be set respectively at the same values for all axes. In such cases, by setting the acceleration and deceleration time constants at optimum values for each individual axis, the operation cycle time can be further shortened.

The above description has been given by taking a six-axis articulated robot configuration as an example, but for robots of other configurations also, the acceleration time constant and deceleration time constant can be set at optimum values in the same manner as described above, to shorten the operation time of the robot.

As described, in the method of controlling acceleration and deceleration time constants for a robot according to the invention, the acceleration time constant and deceleration time constant are determined for each individual axis from the ultimate velocity, moment of inertia, static load, etc. Accordingly, the acceleration time constant and deceleration time constant can be set at optimum values, which contribute to shortening the operation time of the robot.

We claim:

1. A method of controlling acceleration and deceleration time constants for a robot wherein operation of the robot is controlled while setting the acceleration and deceleration time constants of a servo motor at optimum values for each of a block of instructions, comprising the steps of:

determining a maximum velocity from an amount of movement as a result of execution of each of a block of instructions;

determining an output torque of a servo motor based in part on said maximum velocity in said each block of instructions and a maximum torque corresponding to said maximum velocity;

determining an acceleration torque and a deceleration torque by subtracting a static load torque from said output torque;

determining a magnitude of acceleration for acceleration and a magnitude of deceleration for deceleration from said acceleration torque and said deceleration torque respectively, and from load inertia at the current position and at the target position of said servo motor;

determining an acceleration time constant and a deceleration time constant from said magnitude of acceleration for acceleration and said magnitude of deceleration for deceleration; and controlling acceleration and deceleration of a robot based upon said acceleration time constant and said deceleration time constant, respectively.

2. A method of controlling acceleration and deceleration time constants for a robot according to claim 1, said method further comprising controlling a plurality of servo motors, wherein of the acceleration time constants of said plurality of servo motors, a largest acceleration time constant in absolute value terms is selected, of the deceleration time constants of servo motors, a largest deceleration time constant in absolute value terms is selected, and all of said plurality of servo motors are controlled using said selected acceleration time constant and said selected deceleration time constant.

3. A method of controlling acceleration and deceleration time constants for a robot according to claim 1, said method further comprising controlling a plurality of servo motors, wherein said plurality of servo motors are controlled by determining said acceleration time constant and said deceleration time constant for each individual servo motor.

* * * * *